(12) United States Patent
Gentric

(10) Patent No.: US 9,049,402 B2
(45) Date of Patent: Jun. 2, 2015

(54) METHOD OF SYNCHRONIZING THE PLAYBACK OF AN AUDIO BROADCAST ON A PLURALITY OF NETWORK OUTPUT DEVICES

(75) Inventor: Philippe Gentric, Fourqueux (FR)

(73) Assignee: NXP, B.V., Eindhoven (NL)

( * ) Notice: Subject to any disclaimer, the term of this patent is extended or adjusted under 35 U.S.C. 154(b) by 1811 days.

(21) Appl. No.: 12/066,718

(22) PCT Filed: Sep. 15, 2006

(86) PCT No.: PCT/IB2006/053303
§ 371 (c)(1),
(2), (4) Date: Mar. 13, 2008

(87) PCT Pub. No.: WO2007/034386
PCT Pub. Date: Mar. 29, 2007

(65) Prior Publication Data
US 2008/0225826 A1  Sep. 18, 2008

(30) Foreign Application Priority Data

Sep. 19, 2005  (EP) .................................... 05300756

(51) Int. Cl.
| *H04L 13/10* | (2006.01) |
| *H04N 7/52* | (2011.01) |
| *H04N 21/2368* | (2011.01) |
| *H04N 21/414* | (2011.01) |

(Continued)

(52) U.S. Cl.
CPC ................. *H04N 7/52* (2013.01); *H04H 60/80* (2013.01); *H04H 60/92* (2013.01); *H04N 21/2368* (2013.01); *H04N 21/41407* (2013.01); *H04N 21/42203* (2013.01); *H04N 21/4307* (2013.01); *H04N 21/4341* (2013.01); *H04N 21/43637* (2013.01); *H04N 21/8113* (2013.01); *H04W 4/02* (2013.01); *H04W 4/06* (2013.01); *H04L 67/18* (2013.01)

(58) Field of Classification Search
USPC .................. 370/201, 304, 277, 270, 310, 503
See application file for complete search history.

(56) References Cited

U.S. PATENT DOCUMENTS

| 6,223,154 | B1 | 4/2001 | Nicholls et al. |
| 6,269,080 | B1 * | 7/2001 | Kumar .......................... 370/236 |

(Continued)

FOREIGN PATENT DOCUMENTS

| CN | 1266312 A | 9/2000 |
| CN | 1505373 A | 6/2004 |

(Continued)

OTHER PUBLICATIONS

Escobar, Julio; et al "Flow Synchronization Protocol" IEEE/ACM Transactions on Networking, vol. 2, No. 2, Apr. 1994, pp. 111-121.

*Primary Examiner* — Andrew Lee

(57) ABSTRACT

Method of synchronizing the playback of an audio broadcast on a plurality of network output devices. The present invention relates to method of synchronizing the playback of an audio broadcast on a plurality of network output devices. Said method comprises the steps of: detecting (11) a set of network output devices located in a same neighborhood which are able to play the audio broadcast, selecting (12) at least one network output device from among the set of network output devices, preventing (13) the network output devices of the set other than the at least one selected network output device to play the audio broadcast.

9 Claims, 2 Drawing Sheets

(51) Int. Cl.
*H04N 21/422* (2011.01)
*H04N 21/43* (2011.01)
*H04N 21/434* (2011.01)
*H04N 21/4363* (2011.01)
*H04N 21/81* (2011.01)
*H04W 4/02* (2009.01)
*H04L 29/08* (2006.01)
H04H 60/80 (2008.01)
H04H 60/92 (2008.01)
H04W 4/06 (2009.01)

(56) References Cited

U.S. PATENT DOCUMENTS

| | | | |
|---|---|---|---|
| 2001/0005368 A1* | 6/2001 | Rune | 370/401 |
| 2002/0122410 A1* | 9/2002 | Kulikov et al. | 370/349 |
| 2002/0141431 A1* | 10/2002 | Tripathy | 370/428 |
| 2002/0159023 A1 | 10/2002 | Swab | |
| 2003/0198255 A1 | 10/2003 | Sullivan et al. | |
| 2003/0198257 A1 | 10/2003 | Sullivan et al. | |
| 2003/0200001 A1 | 10/2003 | Goddard | |
| 2004/0068588 A1 | 4/2004 | Kowalski et al. | |
| 2004/0125777 A1* | 7/2004 | Doyle et al. | 370/338 |
| 2005/0088981 A1* | 4/2005 | Woodruff et al. | 370/260 |
| 2005/0262201 A1* | 11/2005 | Rudolph et al. | 709/205 |
| 2006/0039360 A1* | 2/2006 | Thawani et al. | 370/352 |
| 2007/0186246 A1* | 8/2007 | Goldhor | 725/46 |
| 2010/0219250 A1* | 9/2010 | Wang | 235/462.43 |

FOREIGN PATENT DOCUMENTS

| | | |
|---|---|---|
| DE | 10321001 A1 | 12/2004 |
| JP | 2005175798 A | 6/2005 |
| WO | 03010950 A | 2/2003 |
| WO | 2005/013047 A2 | 2/2005 |

* cited by examiner

METHOD OF SYNCHRONIZING THE PLAYBACK OF AN AUDIO BROADCAST ON A PLURALITY OF NETWORK OUTPUT DEVICES

FIELD OF THE INVENTION

The present invention relates to a method of synchronizing the playback of an audio broadcast on a plurality of network output devices.

The present invention also relates to a communication system comprising a plurality of network output devices adapted to communicate through a communication network and to play an audio broadcast.

The present invention finally relates to a network output device for use in such a communication system.

This invention is, for example, relevant for mobile communications where several network input devices may receive the same audio broadcast at different time instants.

BACKGROUND OF THE INVENTION

Nowadays it may happen that several different network output devices, e.g. mobile phones, in the same neighborhood (e.g. a room) play the same audio broadcast. When this occurs, very annoying artifacts, such as an echo effect for example, are produced.

A typical application is push-to-talk. Push-to-talk is a talkie-walkie like service for mobile phones. Push-to-talk is half duplex and one-to-many. When a push-to-talk burst is being transmitted by a mobile phone user, it may occur that several receivers are actually located in the same room. When this occurs, if nothing is done to prevent it, each receiver will play the sound burst separately and a very disturbing multiple echo effect will be generated. This is due to the fact that the human hear is very sensitive to delays between audio signals originating from the same source. Delays produced can range from a few milliseconds, resulting in a light echo effect, to several tens of milliseconds, which becomes rather annoying, to several hundred of milliseconds, which is extremely disturbing. The delay duration depends on several parameters, e.g.:
  how the receiving device implements the service: for example the Open Mobile Alliance Push-to-talk Over Cellular (OMA POC) service specification does not specify the end-to-end delay so that each implementer will do its best to shorten the delay, i.e. to implement the sending function and the receiving function in order to control the processing time between the capture of audio and the sending of RTP (for "real-time transport protocol") packets on one hand, and the time between the reception of RTP packet and the restitution of sound on the loudspeaker on the other hand;
  how the network is implemented: the number of "hops", the time of flight of packet which is due to routing, and ultimately the distance.

Push-to-talk services always involve at least one server which functions is to relay and broadcast (i.e. the server does the one-to-many replication of media packets). For service and billing reasons there will typically be at least one server per operator, so a push-to-talk path between people subscribed to different operators may exhibit larger delays. For example Alice and Bob are in the same room in England, having a push-to-talk session with Charlie, who is away. When Charlie talks, his voice is routed to Alice through Germany because Alice has a subscription with a German operator, while Charlie's voice is routed to Bob through Japan because Bob has a subscription with a Japanese operator. In such an example, the delay can be very large (e.g. a few seconds) and thus very disturbing.

The US patent application n° 2003/0198257 A1 discloses a method of manually synchronizing the playback of a digital audio broadcast on a plurality of network output devices. The method is applicable for use with methods such as those that use a time code, insert a control track pulse, or use an audio waveform sample for synchronization. The manual adjustment method relies on a graphical user interface for adjustment and audible pulses from the devices which are to be synchronized. The digital audio broadcast from multiple receivers does not present to a listener any audible delay or echo effect.

Similarly, the paper entitled "Flow Synchronization Protocol" by Julio Escobar, Craig Partridge, and Debra Deutsch, IEEE/IACM Transactions on Networking, vol. 2. no. 2. APRIL 1994, discloses an adaptive flow synchronization protocol that permits synchronized delivery of data to and from geographically distributed sites. Applications include interstream synchronization, synchronized delivery of information in a multi-site conference, and synchronization for concurrency control in distributed computations. In this case, the playback across the network output devices is synchronized by buffering data in the faster output network devices for compensating for the delay.

SUMMARY OF THE INVENTION

It is an object of the invention to propose an alternative solution to the ones of the prior art, which is less complex.

To this end, there is provided a method of synchronizing the playback of an audio broadcast on a plurality of network output devices, which comprises the steps of:
  detecting a set of network output devices located in a same neighborhood which are able to play the audio broadcast,
  selecting at least one network output device from among the set of network output devices,
  preventing the network output devices of the set other than the at least one selected network output device to play the audio broadcast.

Beneficially, the selection step is adapted to select the network output device of the set which first receives the audio broadcast.

The present invention also extends to a communication system comprising a plurality of network output devices adapted to communicate through a communication network and to play an audio broadcast. Such a communication system comprises:
  means for detecting a set of network output devices located in a same neighborhood which are able to play the audio broadcast,
  means for selecting at least one network output device from among the set of network output devices,
  means for preventing the network output devices of the set other than the at least one selected network output device to play the audio broadcast.

As explained before, a first network output device of the set will receive the audio broadcast before a second network output device.

According to an embodiment of the invention, the second network output device comprises:
  a microphone for receiving the audio broadcast played by the first network output device, echo cancellation means for muting the same audio broadcast to be played by said second network output device if the audio broadcast has been received by the microphone.

According to another embodiment of the invention, the first input device comprises:

means for identifying the audio broadcast, means for sending a deactivating signal to the second network output device, said deactivating signal indicating that the identified audio broadcast should be muted on said second network output device.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The invention relates to method of synchronizing the playback of an audio broadcast on a plurality of network output devices. The invention can be implemented in a communication system, e.g. a mobile communication system, comprising a plurality of network output devices, e.g. mobile phones, adapted to communicate through a communication network, e.g. a mobile network, such as the GSM or UMTS network.

The invention aims at synchronizing the playback of an audio broadcast on a plurality of network output devices. According to the invention, all network output devices but one are muted in a given neighborhood, in order to avoid the annoying echo effects. Beneficially, the non-muted network output device is chosen because it is the one with the smallest end-to-end delay. This is best for conversational services. It is also very simple to implement. However, it will apparent to a skilled person that the non-muted network output device can be selected according to other criteria, e.g. randomly.

Network output device users in the same room define a neighborhood. The invention is based on the fact that these users should not have to explicitly do something to setup their device. Instead, the network output devices automatically and silently "discover" each other and configure accordingly. Such a feature is already present for all Local Area Network LAN technology, and especially for wireless Local Area Network WLAN technologies (for example 802.11x or Blue Tooth technology). All these network technologies are based on an initial "setup" or "discovery" phase done by a network output device, where some type of local broadcasting is used to discover if other network output devices are present and to initiate protocol negotiation between the network output device and the other network output devices. The invention is based on the use of this feature for local media playback synchronization in a given neighborhood, where the given neighborhood is defined as the set of network output devices that can be reached by the local network technology (e.g. the LAN technology).

Figure 1:
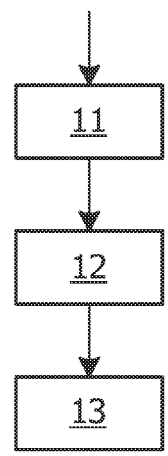
FIG. 1 shows a block diagram of a method of synchronizing the playback of an audio broadcast in accordance with the invention.

FIG. 1 shows a block diagram of a method of synchronizing the playback of an audio broadcast on a plurality of network output devices. This method comprises the steps of:

detecting 11 a set of network output devices located in a same neighborhood, said devices being able to play the audio broadcast, selecting 12 at least one network output device from among the set of network output devices, preventing 13 the network output devices of the set other than the at least one selected network output device to play the audio broadcast.

Figure 2:
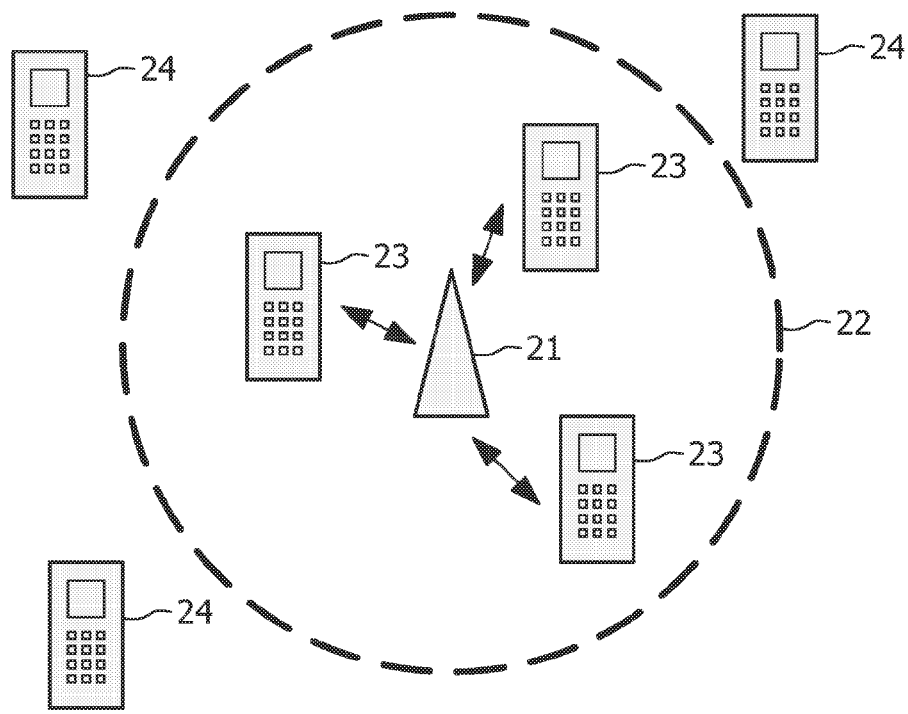
FIG. 2 shows a block diagram of a communication system in accordance with the invention.

FIG. 2 shows a block diagram of a communication system in accordance with the invention. This communication system comprises a network input device 21, e.g. wireless LAN transmitter, able to transmit an audio broadcast to a plurality of network output devices 23, 24. The network input device is able to transmit within a given area 22. Network output devices 23 inside this given area constitute the neighborhood in which the local media playback synchronization needs to be done. Network output devices 24 are outside this neighborhood.

According to an embodiment of the invention, the selection step 12 is based on active echo cancellation techniques. In this embodiment, the fastest network output device produces sounds that are captured by the other network output devices microphones and used as canceling input to remove the same signal when it is decoded by slower devices.

Figure 3:
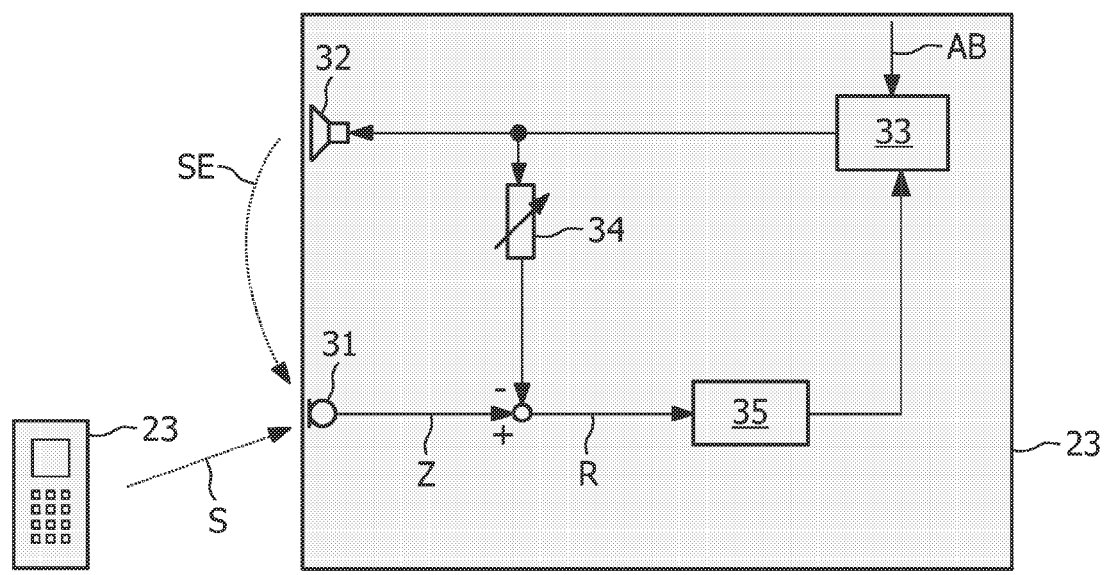
FIG. 3 shows a block diagram of an acoustic echo cancellation scheme.

In more detail, an acoustic echo cancellation scheme is depicted in FIG. 3. According to this scheme, the network output device comprises a microphone 31 for receiving the audio broadcast S played by a faster network output device, if any. The network output device also comprises a pre-processor 32 for pre-processing the audio broadcast AB received over the LAN and a loudspeaker 33 for playing back the pre-processed audio broadcast, if required. The network output device also comprises an adaptive filter 34, which has at its output an estimate of an echo signal SE delivered by the loudspeaker 33. Next, this estimated echo signal SE is subtracted from a signal z delivered by the microphone, yielding an echo residual signal R. The echo residual signal is then fed to a post-processor 35.

This solution offers the advantage that, for a large crowd or in case people are spread over a great distance, several network output devices can emerge in various locations of the neighborhood and mute their neighbors. This is due to the fact that the sound level decreases with distance, and a network output device that receives signal rapidly and is far from another fast network output device will not be muted. One key advantage of this embodiment is that it is auto-adaptive, namely if the user of a slower network output device is close to a faster network output device, the slower network output device is muted but the user of the latter device is able to hear clearly the signal from the faster network output device. But if the user of a slower network output device is far from said faster network output device, the audio signal from the faster network output device is too low to be heard, and then the slower network output device is not muted.

According to another embodiment of the invention, a specific signalization is provided on the WLAN such that a selected network output device can broadcast to its neighbors that they must remain silent, typically because it has been determined that this selected network output device has the shortest end-to-end delay.

The implementation is as follows. Each network output device uses the broadcast capabilities of the LAN/WLAN, and each network output device listens for LAN/WLAN broadcast. When a network output device receives the first media packet of the audio broadcast, this device plays this packet and broadcasts the corresponding session identifier ID and media time stamp on the LAN/WLAN, unless this device has received over the LAN/WLAN a signal from an other network output device indicating that this other network output device has already received this same media packet based on the same session ID and media time stamp.

This way only the fastest device (i.e. the one with the smallest media travel time) will play, and by broadcasting relevant parameters (e.g. session identifier and media time stamp) will inhibit all other network output devices in its WLAN neighborhood.

An example of application of the method in accordance with the invention can be called "quiet disco". According to this application, people can dance according to a music played by a limited number of network output devices without audible interference from the other network output devices present in their neighborhood.

Note that the "quiet disco" application can also be achieved using a broadcast mechanism (one device sends the content), the advantage of playing the same copy from each device is that it does not consume any network bandwidth (synchronization information represents only a small amount of data), which saves direct cost in case the network is not free. Also some very low bandwidth network, much lower than the media bandwidth, can be used.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa.

The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of synchronizing playback of an audio broadcast on a plurality of network output devices, said method comprising the steps of:
   detecting a set of network output devices located in a same neighborhood which are able to play the audio broadcast,
   selecting at least one network output device from among the set of network output devices,
   preventing, in response to the selection, the network output devices of the set other than the at least one selected network output device from playing the audio broadcast.

2. A method as claimed in claim 1, wherein the selection step is adapted to select the network output device of the set which first receives the audio broadcast.

3. The method of claim 1, further including a step of transmitting a deactivation signal from the at least one selected network output device to the network output devices of the set other than the at least one selected network output device and wherein the step of preventing is carried out in response to receipt of the deactivation signal.

4. The method of claim 1, further including a step of receiving, using a microphone and at the network output devices of the set other than the at least one selected network output device, an audio signal from the at least one selected network output device and wherein the step of preventing is carried out by performing echo cancellation based upon the received audio signal.

5. A communication system comprising a plurality of network output devices adapted to communicate through a communication network and to play an audio broadcast, said system comprising:
   one or more processing circuits configured and arranged
      for detecting a set of network output devices located in a same neighborhood which are able to play the audio broadcast,
      for selecting at least one network output device from among the set of network output devices,
      for preventing, in response to selecting the at least one network output device, the network output devices of the set other than the at least one selected network output device from playing the audio broadcast.

6. A communication system as claimed in claim 5, further including a first and second network output device, wherein the first network output device is configured to receive the audio broadcast before a second network output device and wherein the second network output device comprises:
   a microphone for receiving the audio broadcast played by the first network output device,
   echo cancellation circuitry for muting an audio broadcast to be played by said second network output device if the same audio broadcast as the audio broadcast for muting has been received by the microphone.

7. A communication system as claimed in claim 5, further including a first network output device and wherein the first network output device is configured and arranged to:
   identify the audio broadcast,
   send, in response to receiving the audio broadcast before other network output devices of the set receive the audio broadcast, a deactivating signal to the other network output devices, said deactivating signal indicating that the identified audio broadcast should be muted on said other network output devices.

8. A communication system as claimed in claim 5, said network output device comprising:
   a microphone for receiving the audio broadcast,
   echo cancellation circuit for muting an audio broadcast to be played by the network output device if the same audio broadcast as the audio broadcast for muting has been received by the microphone.

9. A communication system as claimed in claim 5, said network output device configured and arranged to:
   identify the audio broadcast,
   send a deactivating signal to other network output devices of its neighborhood, unless such a deactivating signal has been received by said network output device, said deactivating signal indicating that the identified audio broadcast should be muted on said other network output devices.

* * * * *